M. W. HALL.
EGG WHISKER AND CAKE MIXER.
APPLICATION FILED DEC. 9, 1908.

917,289.

Patented Apr. 6, 1909.

WITNESSES

INVENTOR.
BY Michael W. Hall,
ATTORNEY

UNITED STATES PATENT OFFICE.

MICHAEL W. HALL, OF SAN FRANCISCO, CALIFORNIA.

EGG-WHISKER AND CAKE-MIXER.

No. 917,289.  Specification of Letters Patent.  Patented April 6, 1909.

Application filed December 9, 1908. Serial No. 466,702.

*To all whom it may concern:*

Be it known that I, MICHAEL W. HALL, a citizen of the United States, residing at San Francisco, in the county of San Francisco and State of California, have invented new and useful Improvements in Egg-Whiskers and Cake-Mixers, of which the following is a specification.

The object of the present invention is to provide an apparatus for beating eggs or mixing cake in which the motion of the parts which agitate, beat, or mix, such materials shall be as effective as possible, and by means of which said motion can be varied as desired for differences in the material being treated.

Figure 1:
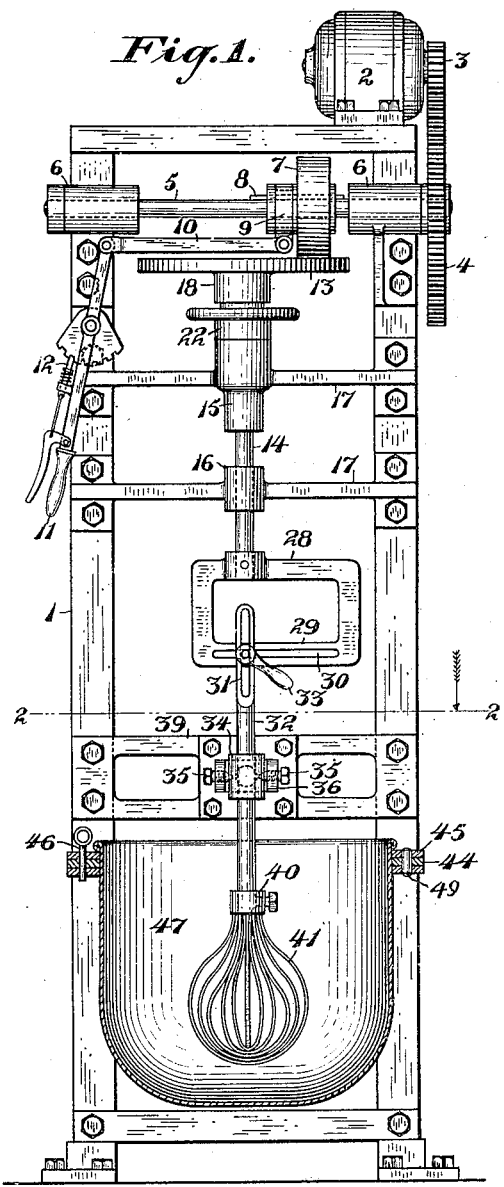
Figure 2:
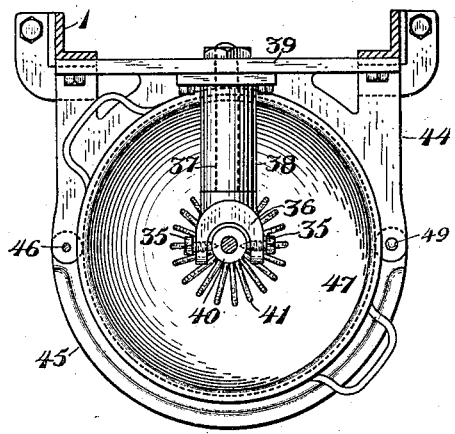
Figure 3:
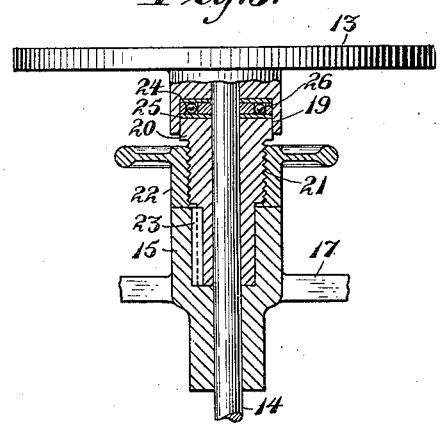

In the accompanying drawing, Figure 1 is a front view of the apparatus, the bowl being shown in section; Fig. 2 is a horizontal section on the line 2—2 of Fig. 1; Fig. 3 is an enlarged detail partial vertical section, showing the means for varying the pressure of the friction gearing.

Referring to the drawing, 1 indicates a suitable frame or stand, on the top of which is mounted an electric motor 2, which, by means of a pinion 3 and a gear wheel 4, drives a transverse shaft 5 rotating in bearings 6. Upon said shaft 5 is a friction wheel 7, which rotates with the shaft through the medium of a key 8, but is slidable, thereon by means of a collar 9, actuated through a link 10 by means of a hand lever 11 having a spring latch 12. Said friction wheel 7 frictionally engages the face of a friction disk 13 secured on the upper end of a shaft 14, which rotates in upper and lower bearings 15, 16, supported by transverse bars 17, secured upon the frame. In order to vary the pressure of the disk 13 against the friction wheel 7, the hub 18 of said disk is concaved, as shown at 19, and within said concavity can slide a tube 20 around the shaft 14, said tube being threaded on the outside as shown at 21, and screwed on to said threaded portion of the tube is a sleeve 22, the lower end of which abuts against the upper end of the bearing 15. The tube 20 is prevented from turning by means of a key 23 formed on the bearing fitting within a groove formed in the tube. Between the upper end of the tube 20 and the inner surface of the concavity 19 are interposed disks 24, 25, between which is a ring of balls 26. By turning the hand wheel, the tube can be moved up or down, as may be desired, thereby varying the pressure between the friction wheel 7 and disk 13 without materially varying the amount of friction opposing the rotation of the shaft 14 in its bearings.

The lower end of said shaft 14 is secured to a rectangular frame 28, the lower horizontal bar 29 of which is slotted, as shown at 30. Crossing said bar is the upper slotted end 31 of a rod 32, said rod 32 being secured to said bar 29 adjustably by means of said slots in the rod and bar, and by a clamping lever 33. This arrangement permits of adjustment of the bar 29 both vertically and laterally. Said bar rotates in a sleeve 34, which can swing on horizontal trunnions formed by the pointed ends of screws 35, screwed into opposite sides of a yoke 36 formed on the head of a spindle 37, which can rotate in a horizontal forwardly extending bearing 38 secured to a transverse piece 39 secured on the frame of the machine. To the lower end of the rod 32 is secured, as shown at 40, a beater 41, preferably formed of a suitable number of loops of wire. Secured to the frame of the machine, as shown at 43, is a horizontal bracket or frame 44, the inner edge of which is substantially semi-circular, to which is pivotally attached at one side as shown at 49 a semi-circular supporting arm 45, the other end of which is adapted to be fastened to the other side of the frame by means of a pin 46. When so secured the frame and arm form the support for a mixing bowl 47.

The mode of operation of the apparatus will be readily understood from the foregoing description. When the rod 32 is in vertical alinement with the shaft 14, the motion of the beater is one of simple rotation, but when the rod is tilted to one side so as to extend obliquely, the beater then revolves about the vertical line of the shaft as an axis.

I claim:—

1. In an apparatus of the character described, the combination of a suitable frame, means for supporting a bowl, a vertical shaft, a friction disk rotatable with said shaft, a horizontal shaft, a friction wheel rotatable therewith, and movable thereon, said friction wheel being adapted to frictionally engage said friction disk, a beater arranged to rotate with said shaft, and means for varying the pressure of said friction disk against said friction wheel, substantially as described.

2. In an apparatus of the character described, the combination of a suitable frame, means for supporting a bowl, a vertical shaft, a friction disk rotatable with said shaft, a horizontal shaft, a friction wheel rotatable therewith, and movable thereon, said friction wheel adapted to frictionally engage said friction disk, a beater arranged to rotate with said shaft, and a lever for moving said friction wheel on said shaft across the face of said disk, substantially as described.

3. The combination of a frame, means for supporting a bowl, a vertical shaft, a friction disk rotating to said shaft, a horizontal shaft, a friction wheel thereon engaging said friction disk, a beater, a rod therefor, a bearing for said rod, a swiveling support for said bearing, and means for adjustably connecting said rod to said shaft, substantially as described.

4. The combination of a frame, means for supporting a bowl, a vertical shaft, a friction disk rotating to said shaft, a horizontal shaft, a friction wheel thereon engaging said friction disk, a beater, a rod therefor, a bearing for said rod, a swiveling support for said bearing, and means for adjustably connecting said rod to said shaft, at a variable inclination, substantially as described.

5. The combination of a frame, means for supporting a bowl, a vertical shaft, a friction disk rotating to said shaft, a horizontal shaft, a friction wheel thereon engaging said friction disk, a beater, a rod therefor, a bearing for said rod, a swiveling support for said bearing, and means for adjustably connecting said rod to said shaft, so as to vary height of the beater, substantially as described.

6. The combination of a frame, means for supporting a bowl, a vertical shaft, a friction disk rotating to said shaft, a horizontal shaft, a friction wheel thereon engaging said friction disk, a beater, a rod therefor, a bearing for said rod, a swiveling support for said bearing, and means for connecting said rod to said shaft, variably both as to the height of the beater and the inclination of the rod, substantially as described.

In testimony whereof I have hereunto set my hand in the presence of two subscribing witnesses.

MICHAEL W. HALL.

Witnesses:
   FRANCIS M. WRIGHT,
   D. B. RICHARDS.